United States Patent [19]

Cogliano

[11] Patent Number: 5,478,240
[45] Date of Patent: Dec. 26, 1995

[54] EDUCATIONAL TOY

[76] Inventor: Mary Ann Cogliano, 7624 Spruce Run Ct., Las Vegas, Nev. 89128

[21] Appl. No.: 205,660

[22] Filed: Mar. 4, 1994

[51] Int. Cl.⁶ ........................................... G09B 7/00
[52] U.S. Cl. ................ 434/327; 434/169; 434/337; 434/365; 446/143
[58] Field of Search .................... 434/156, 157, 434/159, 169, 178, 185, 201, 259, 297, 307 R, 308, 317, 322, 323, 327, 334, 337, 339, 350, 362, 365; 446/143, 397; 273/236–239, 272; 40/409, 411, 427; D21/59, 73, 74, 148, 157

[56] References Cited

U.S. PATENT DOCUMENTS

| | | |
|---|---|---|
| 1,635,770 | 7/1927 | Starke . |
| 1,639,442 | 8/1927 | Strauss et al. . |
| 2,098,166 | 11/1937 | Rubenstein . |
| 3,508,349 | 4/1970 | Gilden et al. . |
| 3,568,336 | 3/1971 | Noble . |
| 4,114,292 | 9/1978 | Smith ..................................... 434/335 |
| 4,224,759 | 9/1980 | Saint-Pierre et al. . |
| 4,245,405 | 1/1981 | Lien et al. . |
| 4,280,809 | 7/1981 | Greenberg et al. ...................... 434/343 |
| 4,307,534 | 12/1981 | Tomita ................... 434/327 X |
| 4,358,278 | 11/1982 | Goldfarb . |
| 4,611,995 | 9/1986 | Sado . |
| 4,681,548 | 7/1987 | Lemelson ............................ 434/308 X |
| 4,731,027 | 3/1988 | Phinney . |
| 4,846,693 | 7/1989 | Baer . |
| 4,930,019 | 5/1990 | Chu ..................................... 434/323 X |
| 4,936,780 | 6/1990 | Cogliano ............................. 446/397 X |
| 5,120,065 | 6/1992 | Driscoll et al. . |

FOREIGN PATENT DOCUMENTS 2597243 10/1987 France .

Primary Examiner—Joe H. Cheng
Attorney, Agent, or Firm—Hoffman, Wasson & Gitler

[57] ABSTRACT

An electronic toy for teaching a child language and arithmetic skills utilizing a keyboard which is associated with the toy. Various illustrated cards intended to assist the child in learning language and mathematical skills are inserted into a slot associated with the keyboard. The portion of the card would include some sort of indicia which would prompt a child to utilize one or more keys in a particular order of the keyboard to spell a word or solve a mathematical problem. The portion of the card inserted into the slot has machine readable information included thereon which, a computer contained in the toy, would compare to the keys depressed by the child. Proper depression of the keys would be vocalized by the toy as well as appear on a display. Furthermore, various portions of the toy would move based upon the correct depression of the keys.

19 Claims, 5 Drawing Sheets

EDUCATIONAL TOY

BACKGROUND OF THE INVENTION

The recent development of various electronic devices and computers have radically changed the manner that we, as individuals, interact with the world around us. These devices have the ability to process information on an incredible scale and to output this information in a manner in which even lay people can understand. These devices have applications in every day life, such as controlling the utilization of various household appliances, controlling the operation of motor vehicles as well as presenting different ideas in new and exciting manners.

As could be expected, the field of education has embraced this new technology with open arms, due to the incredible possibilities and applications to which computers and other electronic devices can be applied to this field. Computers and other interactive devices, once limited to the realm of the scientists have, at first gradually, and now with increasing frequency, been utilized as a teaching tool in both primary and secondary schools.

This evolution in the manner in which we teach our students has found its way into the instruction of various reading and language skills. Although, historically, the use of technology was limited to the now "archaic language labs", various computer programs would allow a student at the pre-school, primary or secondary level to receive instructions relating to the teaching of basic, as well as advanced word and language skills. These innovative teaching systems are not limited to computers nor are they limited to teaching grade school students. For example, some of these devices are illustrated in U.S. Pat. Nos. 3,508,349 issued to Gilden et al; 4,245,405 issued to Lien et al; 4,358,278 issued to Goldfarb; 4,611,995 issued to Sado; 4,731,027 issued to Phinney; 5,120,065 issued to Driscoll et al, as well as French Patent 2,597,243.

The patent to Gilden et al describes an educational device for teaching children how to spell and identify letters. A coded program card would contain a legend and a corresponding picture representing the word to be spelled. A keyboard is provided having a plurality of keys thereon. Once a child correctly depresses all of the letters shown in the legend, a bell may be sounded to indicate that the word has been correctly spelled. French patent 2,597,243 shows a reading game for children provided with a voice synthesizer which would be activated when letters are properly placed within the machine to spell a particular item. The patent to Goldfarb shows an electronic learning apparatus used to help a child learn to spell. A disc having a plurality of items thereon is inserted into the apparatus which includes a keyboard. The periphery of the disc is provided with answer codes which are photo-optically read therefrom. This answer code is compared to the keyed answer from the user to give an indication of correctness or error. The keyboard can be provided with a number of different overlays which would allow the teaching of different arithmetic operations.

Although these patents illustrate various educational devices for assisting in the teaching of spelling, language and mathematical skills to a child, none of these patents are provided within an environment which would positively reinforce the correct spelling of a particular word, as well as allow the child to play with the device when it is not being used in the teaching mode. In this context, U.S. Pat. Nos. 3,568,336 issued to Noble and 4,846,693 issued to Baer are of interest since they are directed to educational devices associated with an animated figure. For instance, the patent to Noble shows a remote controlled educational game in which a dog would open its mouth a plurality of times based upon the number of pegs correctly inserted into various holes. However, the purpose of this game is to assist the child in developing his or her counting skills and not word or language skills. Additionally, the patent to Baer shows a video based instructional and entertainment system in which an animated figure, such as a bear would operate.

SUMMARY OF THE INVENTION

The deficiencies of the prior art are addressed in the present invention which is directed to a toy, in the form of a playful animal, such as a tortoise, which includes an electronic game for helping pre-schoolers and other children to read, as well as to add and subtract and perform other mathematical computations. This toy is provided with a voice synthesizer as well as a microprocessor control. A number of cards containing various figures, as well as at least one word associated with each figure are adapted to be inserted into a game card slot. At this point, the child will depress a number of letters in sequence in order to spell the word on the card. Each time a letter is depressed, the voice synthesizer would vocalize the letter which would also appear on the screen. When the word is properly displayed, an "enter" button is depressed and an audio and visual result would occur, thereby indicating that the word has been properly spelled.

Similarly, various mathematical operations, such as addition and subtraction would be provided on the face of the card. Once inserted into the game slot, the child would depress the keys representing the operation, and would then depress a key indicating the result of the operation.

The present invention would therefore assist in the early development of a child's language and arithmetic skills. Since this invention is combined with a toy, it would assist in all aspects of a child's development—intellectual, physical, social and creative. The invention is an excellent preparation for developing small muscle skills, as well as hand-eye coordination, which is a readiness skill for reading and writing.

The present invention also stimulates intellectual development in decision making, memory, spelling, mathematics and strategic thinking. This invention prepares children to become creative, self-directed learners. It is a known fact that children that begin to read as soon as possible maintain significant gains in verbal intelligence. Once a child is introduced to the present invention, he/she will develop a lifetime love for reading and mathematics.

For a full understanding of the present invention, reference should now be made to the following detailed description of the preferred embodiments of the invention and to the accompanying drawings.

DETAILED DESCRIPTION OF PREFERRED EMBODIMENTS

Figure 1:
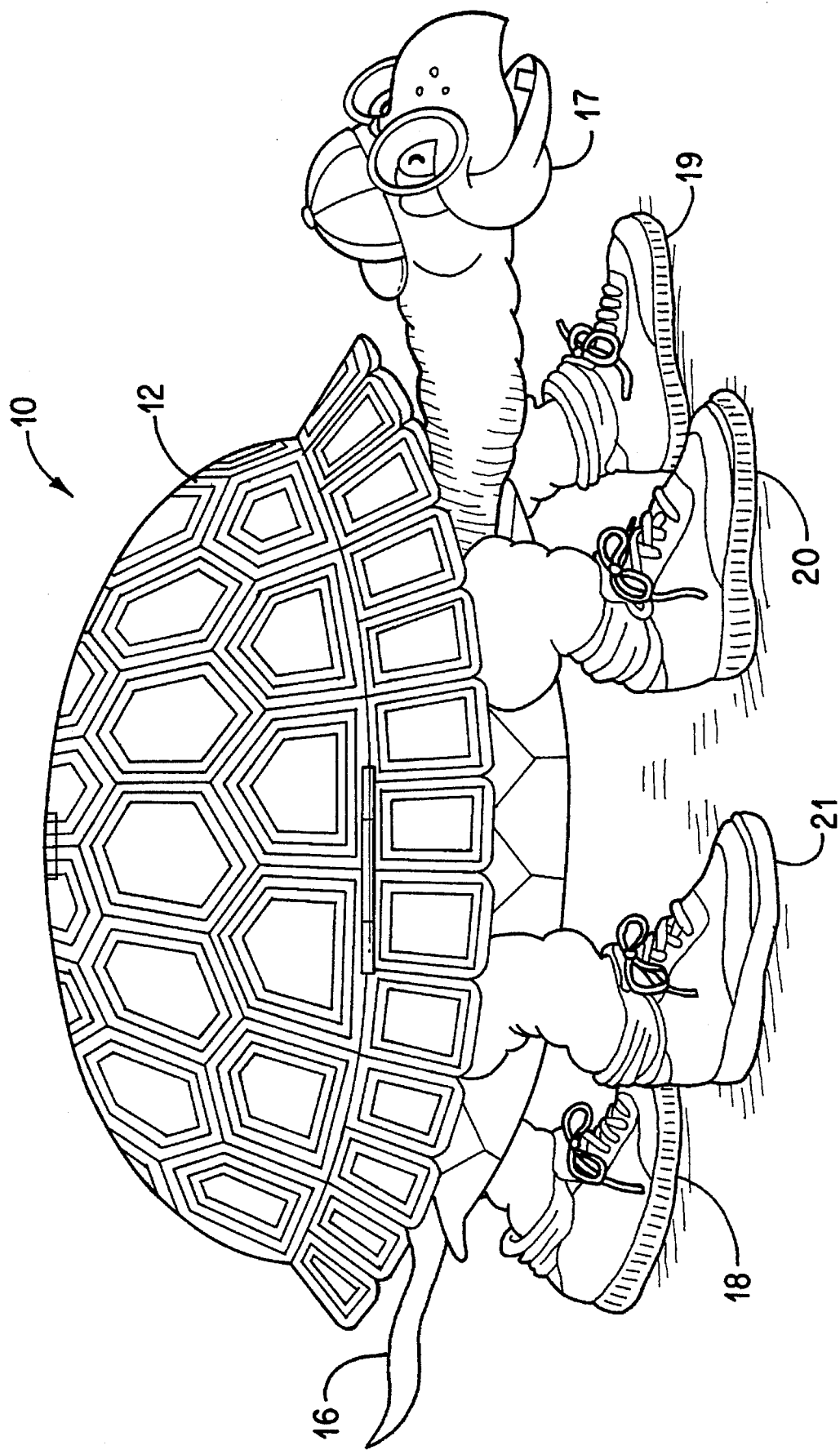
FIG. 1 is a perspective view of the present invention.

As shown in FIG. 1, the educational toy 10 is configured in the shape of a tortoise having an external shell 12 constructed from flush non-toxic materials. The tortoise is provided with a head 17, a tail 16 and four legs 18, 19, 20 and 21 for stability. Although the present invention is illustrated in the form of a tortoise, it can be appreciated that a multitude of forms simulating various figures can be utilized.

Figure 2:
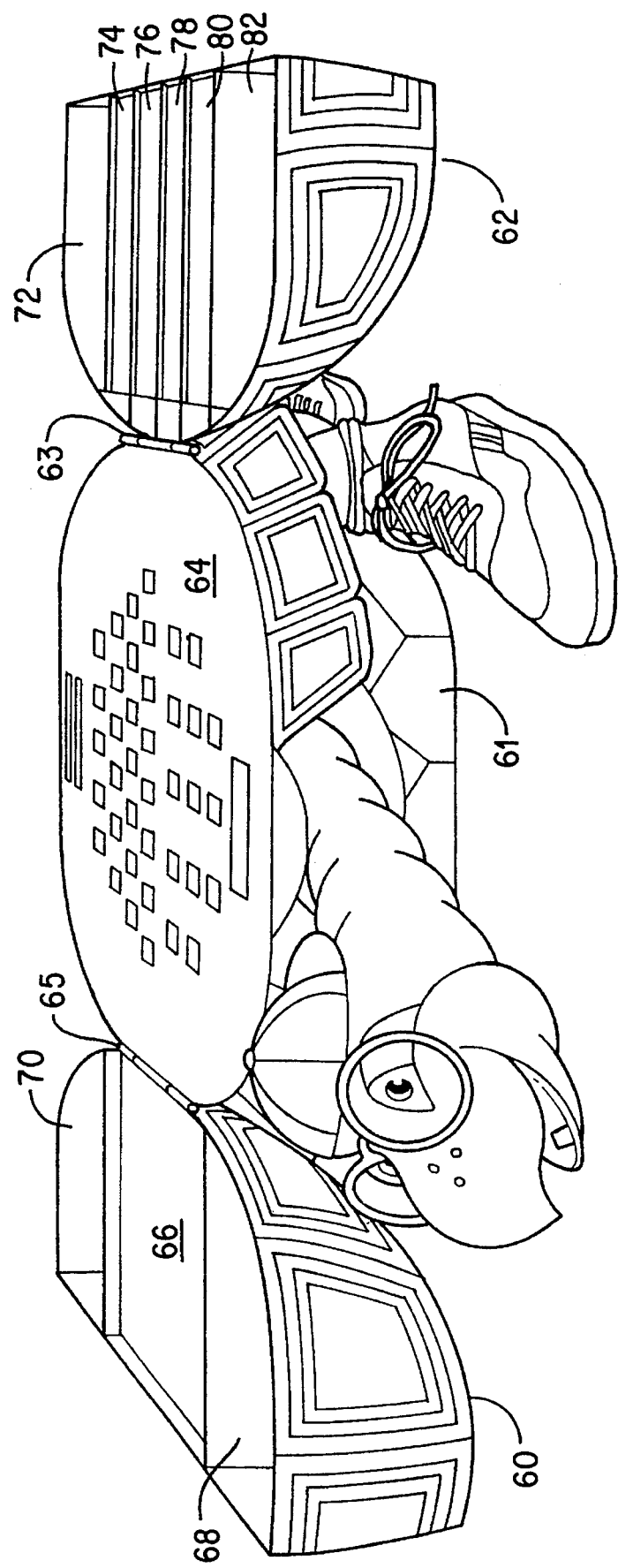
FIG. 2 is a perspective view of the present invention showing the interior of the present invention.
Figure 3:
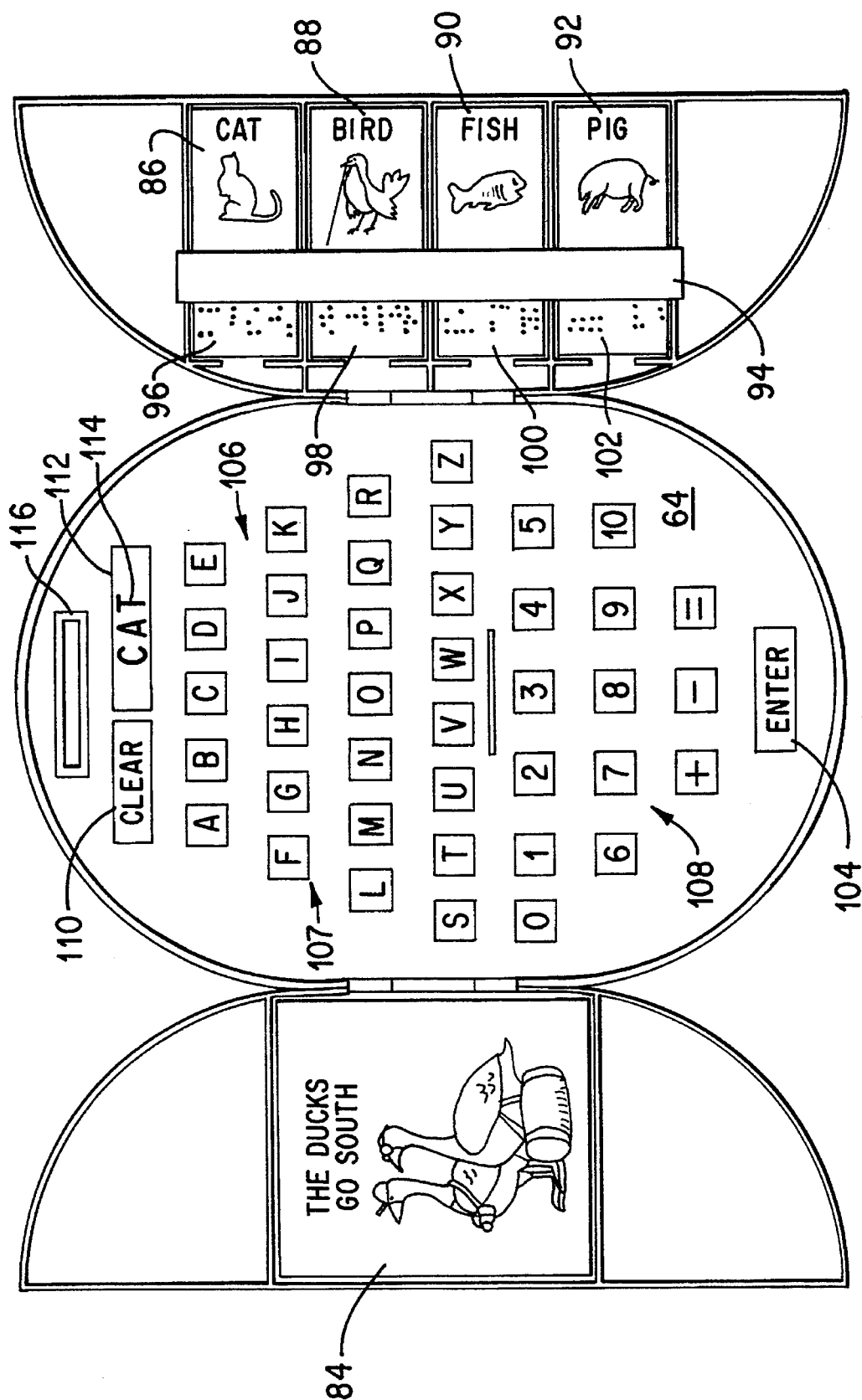
FIG. 3 is a plan view of the keyboard of the present invention.
Figure 4:
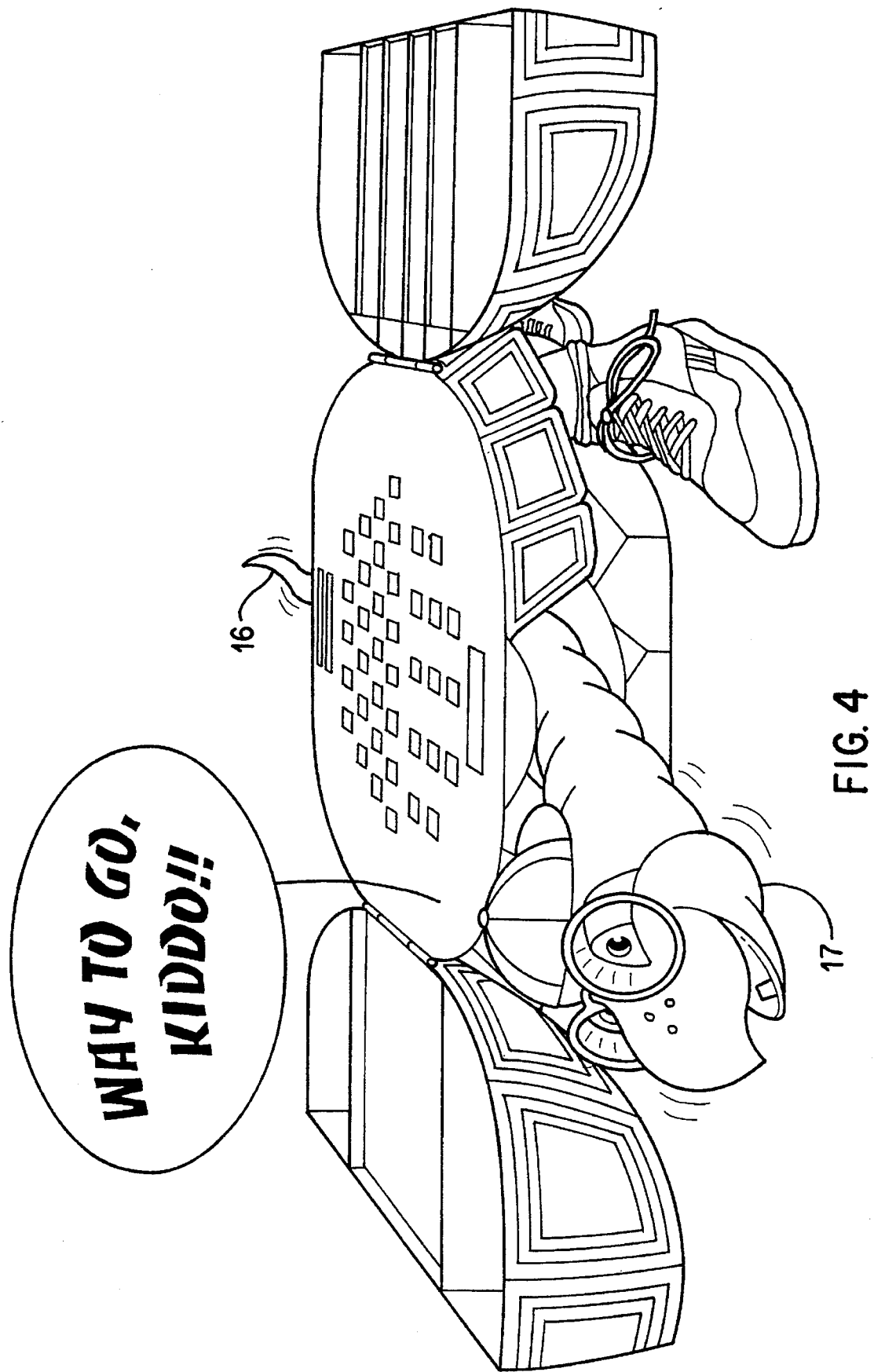
FIG. 4 is a perspective view of the present invention showing a positive response of the educational toy to a proper input from the child.

FIGS. 2 and 3 show the educational toy in the open position ready for use to instruct children in word and mathematical skills. Hinges 63 and 65 are provided for opening the shell of the tortoise from the closed position shown in FIG. 1. Of course it is possible that the shell 12 can be hinged to the body portion at only a single position. A keyboard 106 is provided on the surface 64 of a base portion 61 of the external shell. Once opened, the tortoise is also provided with first and second side pocket portions 60 and 62 in which various items can be stored or displayed. For example, the first side portion 60 can include a planar surface 66, in the middle thereof, on which an easy to read story booklet 84 can be supported. Additional booklets or other items can be stored in pocket areas 68 and 70.

The second side portion 62 can support various coded game cards 86, 88, 90 and 92 secured by an elastic strap 94. Alternatively, these game cards or other items can be stored in various pockets 72, 74, 76, 78, 80 and 82.

Planar surface 64 contains a keyboard 106 used as an input to a mini-computer stored within base portion 61. The keyboard includes a plurality of easy-to-read florescent letters 107 and numbers 108 which can be slightly raised for easy letter or number identification.

A game card slot 116 is included and functions as an interactive input to the mini-computer. Each of the game cards 86, 88, 90 and 92 is provided with various coded indicia 96, 98, 100 and 102 which is to be read by the computer. This input can be read by the computer in many ways, such as utilizing a photo-optic device to read bar type code or a tactile type device for reading a series of raised bumps. Alternatively, the material to be read by the computer could be contained on a magnetic type stripe. This information relays to the computer the type of card which is inserted into the slot 116 as well assisting the computer in determining the proper sequence response. This allows the computer to determine whether the child has depressed the keys in a correct manner to spell a particular word or to solve a simple arithmetic problem.

For example, if game card 86 is inserted into the game card slot 116, the computer would read the information provided in section 96, while the illustration of a cat as well as the letters "CAT" would be displayed to the child. Thereafter, the child would depress the letters CAT in sequence utilizing the keys 106. Once pressed, the computer would vocalize the letter which would appear prominently in display 112. After the letters CAT 114 were spelled, the child would depress the enter button 104 at which time the computer would vocalize the entire word. A CLEAR button 110 is included for clearing the screen of a certain letter if a particular key was incorrectly depressed.

Once the entire word was properly spelled, either before, after or during the vocalization of the correct word, the toy head 17 and/or tail 16 of the toy would move an appreciative manner. Similarly, if the toy is in the form of a tortoise, the tortoise's head could move in and out of the base portion of the shell 61.

Figure 5:
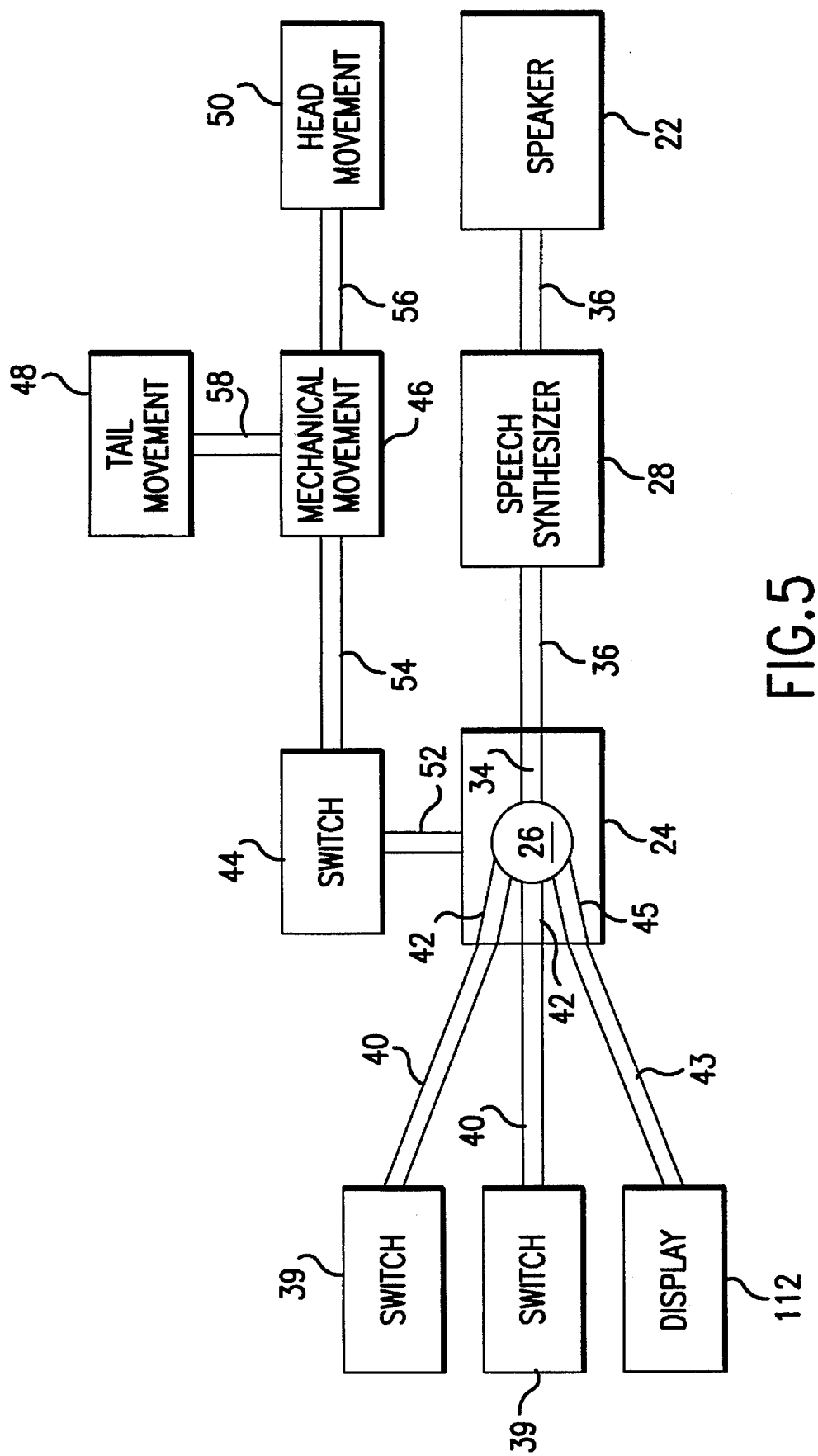
FIG. 5 is a block diagram of the operation of the present invention.

FIG. 5 illustrates the manner in which the mini-computer would operate to assist a child in learning language and mathematical skills. Once one of the cards 86, 88, 90 or 92 is inserted within game card slot 116, the computer would read the information contained in portion 96, 98, 100 or 102, respectively. Responsive to the illustrations contained on the game card 86, 88, 90 and 92, the child would depress one or more of the keys 106, 108. The depression of the keys would enable various switches 39 which are connected to a printed circuit 24 by way of respective conductor 40. The printed circuit 24 would contain a semiconductor type memory, such as a read only memory (ROM), random access memory (RAM), erasable programmable read only memory (EPROM), or the like. Conductive tracings 42 on the printed circuit are connected to the various conductors 40. Once one of the switches 39 is depressed, it will be compared to the information provided on the game cards to determine whether the child has depressed the correct key. If the correct key has been depressed, tracings 34, provided on the printed circuit 24 would connect the computer to a voice synthesizer 28 using a conductor 36 and then to a speaker 22 to provide the child with a positive reinforcement by verbalizing the letter which has been depressed. The printed circuit 24 is connected to the display 112 via conductor 43 and tracing 45 which would concurrently display the letter which has just been depressed. If the child depresses an incorrect key, the voice synthesizer 28 would vocalize a phrase such as "try again" or a particular sound. Similarly, the display 112 would also indicate that an incorrect letter has been depressed.

Once a word has been correctly spelled in its entirety or a mathematical problem has been properly solved, a switch 44 connected to the printed circuit 24 via a conductor 52 would enable various parts of the animal to move utilizing mechanical movement 46 which are enabled by the switch 44 through a conductor 54. This mechanical movement device 46 is connected, in the example of a tortoise, to move the head through a head movement device 50, as well as to move the tail through a tail movement device 48. The general mechanical movement device 46 is connected to the head movement device 50 via a conductor 46 and to the tail movement device 48 via a conductor 58.

The particular manner in which various parts of the animal can move is well known in the art as shown in U.S. Pat. Nos. 1,635,770 issued to Starke; 1,639,442 issued to Strauss; 2,098,166 issued to Rubenstein and 4,224,759 issued to Saint-Pierre, all of which have been incorporated by reference.

Although the present invention has been described with reference to specific details of preferred embodiments thereof, it is not intended that such details should be regarded as limitations upon the scope of the invention.

What is claimed is:

1. An educational toy, comprising:

a simulative figure having a body provided with at least one appendage extending from said body and a means for moving said appendage;

a keyboard provided with a plurality of input keys and a card slot, said keyboard connected to said figure;

a microprocessor having a scanning device, said microprocessor connected to said keyboard;

a plurality of program cards to be inserted into said card slot, each of said program cards provided with a first portion having visual indicia thereon and a second portion provided with information associated with said visual indicia, said information in a form able to be read by said scanning device; and a means provided between said microprocessor and said means for moving said appendage, for initiating movement of said appendage when, after one of said program cards is inserted into said card slot and said information provided on said second portion of said program card is scanned by said scanning device of said microprocessor, said plurality of input keys is depressed in a particular sequence, by an user, wherein said movement of said appendage is indicative of a correct response of said sequentially depressed input keys to one of said program cards inserted into said card slot.

2. The educational toy in accordance with claim 1, wherein said toy includes a voice synthesizer and a speaker connected to said microprocessor, and each of said plurality of input keys is provided with indicia thereon for providing a verbal output when one of said input keys is depressed.

3. The educational toy in accordance with claim 2 further including a display device connected to said microprocessor for providing a visual output responsive to the depression of one of said input keys.

4. The educational toy in accordance with claim 1 further including a display device connected to said microprocessor for providing a visual output responsive to the depression of one of said input keys.

5. The educational toy in accordance with claim 1 wherein said figure is illustrative of a tortoise and said appendages include a head and tail.

6. The educational toy in accordance with claim 5, wherein said tortoise includes an upper shell attached to said body by a hinge, allowing access to the interior of said body when said upper shell is in an opened position, and further wherein said keyboard is provided on a planar surface in the interior of said body, said keyboard concealed from view when said shell is in a closed position.

7. The educational toy in accordance with claim 6, wherein said upper shell includes first and second sections, each of said first and second sections attached to said body by a hinge.

8. The educational toy in accordance with claim 7 wherein at least one of first and second sections of said upper shell is provided with at least one storage compartment.

9. The educational toy in accordance with claim 7 wherein said plurality of program cards are secured to an interior portion of said upper shell.

10. The educational toy in accordance with claim 1, wherein said keyboard is concealed from view within said body when a portion of said body is in a closed position and is open to view when said portion of said body is in an opened position.

11. An educational toy comprising:

a simulative figure in the form of a tortoise having a body provided with at least a head appendage extending from said body and a means for moving said head appendage;

a keyboard provided with a plurality of input keys and a card slot;

a microprocessor having a scanning device, said microprocessor connected to said keyboard;

a plurality of program cards to be inserted into said card slot, each of said program cards provided with a first portion having visual indicia thereon and a second portion provided with information associated with said visual indicia, said information in a form able to be read by said scanning device;

an upper shell attached to said body of said tortoise by a hinge, allowing access to the interior of said body when said upper shell is in an open position, wherein said keyboard is provided on a planar surface in the interior od said body, said keyboard concealed from view and protected when said shell is in a closed position; and a means provided between said microprocessor and said means for moving said head appendage, for initiating movement of said head appendage when, after one of said program cards is inserted into said card slot and information provided on said second portion of said program card is scanned by said scanning device of said microprocessor, said plurality of input keys in depressed in a particular sequence by an user, and said movement of said head appendage is indicative of a correct response of said sequentially depressed input keys to said program card inserted into said card slot.

12. The educational toy in accordance with claim 11, wherein said toy includes a voice synthesizer and a speaker connected to said microprocessor, and each of said plurality of input keys is provided with indicia thereon for providing a verbal output when one of said input keys is depressed.

13. The educational toy in accordance with claim 12, further including a display device connected to said microprocessor for providing a visual output responsive to the depression of one of said input keys.

14. The educational toy in accordance with claim 11, further including a display device connected to said microprocessor for providing a visual output responsive to the depression of one of said input keys.

15. The educational toy in accordance with claim 11, wherein said upper shell includes first and second sections, each of said first and second sections attached to said body by a hinge.

16. The educational toy in accordance with claim 15, wherein at least one of first and second sections of said upper shell is provided with at least one storage compartment.

17. The educational toy in accordance with claim 15, wherein said plurality of program cards are secured to an interior portion of said upper shell.

18. The educational toy in accordance with claim 11, wherein said keyboard is concealed from view within said body when a portion of said body is in a closed position and is open to view when said portion of said body is in an opened position.

19. The educational toy in accordance with claim 11, a tail appendage extending from said body and a means for moving said tail appendage, and further including a means provided between said microprocessor and said means for moving said tail appendage, for initiating movement of said tail appendage when, after one of said program cards is inserted into said card slot and said information provided on said second portion of said program card is scanned by said scanning device of said microprocessor, said plurality of input keys is depressed in a particular sequence, and said movement of said tail appendage is indicative of a correct response of said sequentially depressed input keys to said program card inserted into said card slot.

\* \* \* \* \*